July 21, 1970  R. S. ARORA  3,521,101

DYNAMOELECTRIC MACHINE ARMATURE

Filed Dec. 30, 1968  3 Sheets-Sheet 1

INVENTOR
RAM S. ARORA

BY John R. Faulkner
Keith L. Zerschling
ATTORNEYS

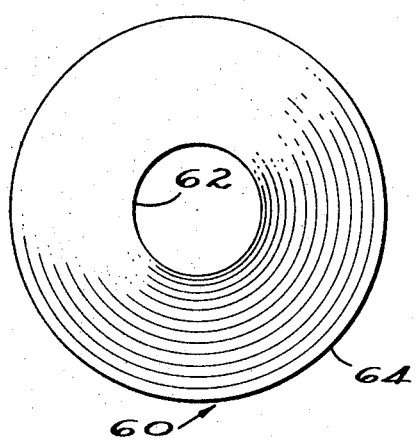
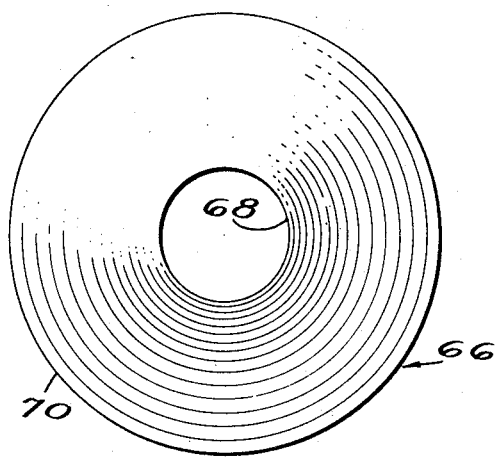
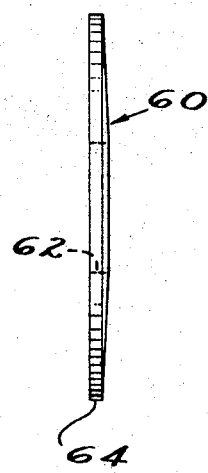
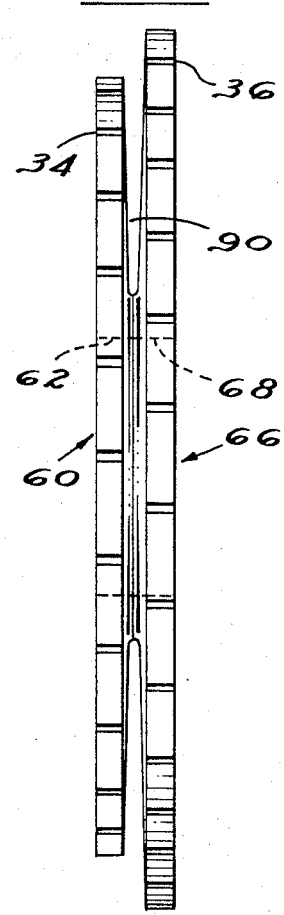
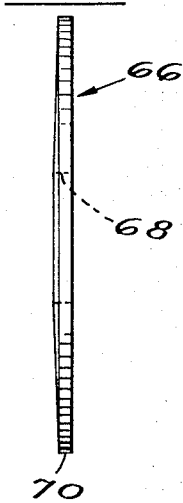

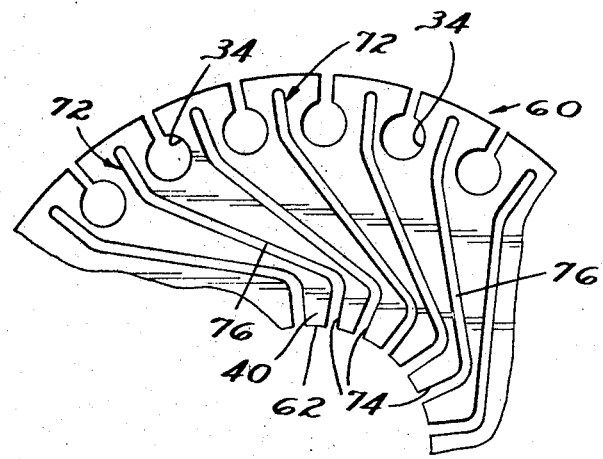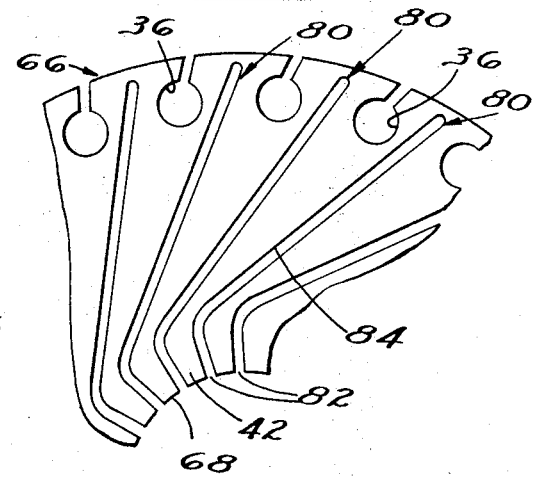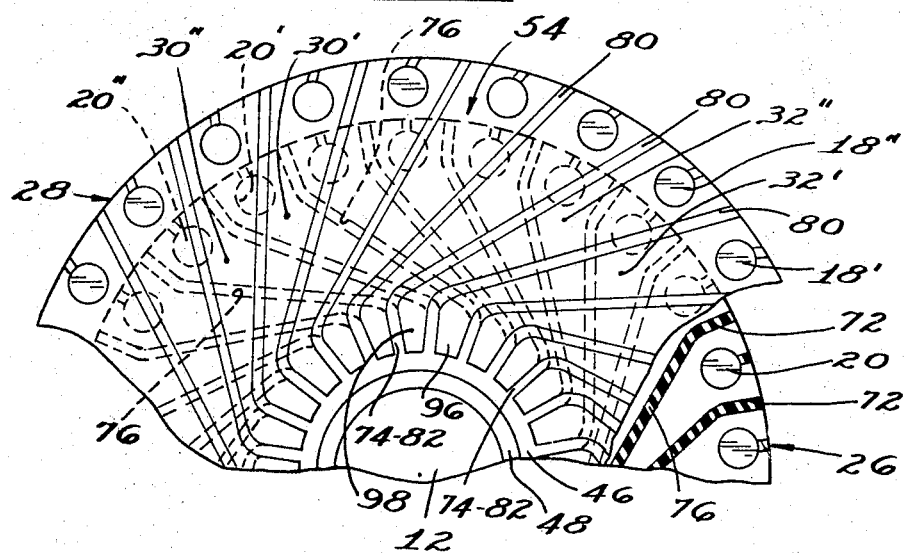

3,521,101
DYNAMOELECTRIC MACHINE ARMATURE
Ram S. Arora, Oak Park, Mich., assignor to Ford Motor
Company, Dearborn, Mich., a corporation of Delaware
Filed Dec. 30, 1968, Ser. No. 787,665
Int. Cl. H02k
U.S. Cl. 310—233                                           12 Claims

ABSTRACT OF THE DISCLOSURE

This disclosure relates to a rotatable dynamoelectric machine armature that comprises a shaft, a stack of a plurality of laminations mounted on the shaft, and a plurality of coil receiving openings formed in the stack of laminations extending the length of the stack and substantially parallel with the axis of the shaft. Each of the coil receiving openings contains at least two conductors which are electrically insulated from each other and which may be radially spaced from each other. The commutator of the armature includes an element having a first conductor receiving means positioned adjacent to and aligned with a first coil receiving opening in the stack of laminations and a second conductor receiving means positioned adjacent to and aligned with the second coil receiving opening in the stack of laminations. The second coil receiving opening is peripherally spaced from the first coil receiving opening, and the first conductor receiving means is electrically connected to a conductor emerging from the first coil receiving opening in the stack of laminations and the second conductor receiving means is electrically connected to a conductor emerging from the second coil receiving opening.

BACKGROUND OF THE INVENTION

This invention relates generally to the field of rotatable armatures for dynamoelectric machines, and more particularly to a rotatable dynamoelectric machine armature having a flat type radial commutator connected to the armature windings or coils.

In dynamoelectric machines of any substantial size, an axial type commutator is generally employed which comprises a plurality of electrically insulated segments. Each segment has a riser positioned thereon for the reception of the ends of different coils of the armature which are positioned through slots or openings in a stack of a plurality of ferromagnetic laminations. The risers are spaced from the end of the stack of laminations, and the ends of the coils or windings are bent through a substantial angle in order to be connected properly to the proper riser of the commutator.

In order to accomplish this purpose, the risers on the commutator segments must be spaced a substantial distance axially from the end of the stack of laminations. Additionally, the coils or windings must include in their length a substantial portion which is bent peripherally from an opening in the stack of laminations to its proper riser in the commutator, in order to be properly connected to a proper segment of the commutator. For example, in a four pole dynamoelectric machine, the end of one of the coils must be inclined at an angle of 45°, and the end of another coil must be inclined in an opposite direction at an angle of 45° in order to properly electrically connect these coils to a riser of a commutator segment.

The present invention not only eliminates the axial space between the riser and the end of the stack of laminations of the conventional commutator, but it also eliminates the need for the additional length of the coil or windings necessary to accommodate the bending of the coils from a position at the end of the stack of laminations to the proper riser. As a result, the dynamoelectric machine armature of the present invention saves the copper used to perform the above mentioned function. Therefore, for the same active length of a conductor, the resistance of the winding is reduced by the length of the brush overhang, i.e., the distance between the end of the stack of laminations and the riser of the commutator. This gives higher motor efficiency and more mechanical output per unit of volume.

SUMMARY OF THE INVENTION

This invention relates to a dynamoelectric machine armature including a commutator in which the armature comprises a shaft having a winding supporting structure mounted thereon, preferably in the form of a plurality of laminations constructed of a ferromagnetic material. This winding supporting structure or a stack of laminations has a plurality of coil receiving openings formed therein and extending the length thereof. They are substantially parallel with the axis of the armature shaft and each of the openings contains at least two conductors which are electrically insulated from each other and which may be radially spaced from each other.

The commutator of the present invention is of the flat radial type and comprises a plurality of metallic commutator elements. Each of these elements has a first conductor receiving means positioned adjacent to and aligned with a first coil receiving opening in the winding supporting structure or stack of laminations. Each metal commutator element also has a second conductor receiving means positioned adjacent to and aligned with another coil receiving opening in the stack of laminations or winding supporting structure. These two coil receiving openings are peripherally spaced about the periphery of the winding supporting structure or stack of laminations. The first conductor receiving means is electrically connected to a conductor emerging from one of the coil receiving openings and the second conductor receiving means is electrically connected to a conductor emerging from the other coil receiving opening.

The commutator is preferably constructed of a pair of stamped copper disks each having a plurality of electrically insulated segments. These disks have different diameters and are spaced axially from one another along the axis of the armature shaft. The disk with the lesser diameter is positioned closely adjacent the end of the winding supporting structure or stack of laminations, and each has a conductor receiving opening that receives the end of the conductor emerging from an opening in the winding supporting structure or stack of laminations. As stated above this opening is directly in line with the opening in the stack of laminations so that the end of the conductor need not be bent through any angle whatsoever. With two conductors positioned in the same opening and radially spaced from one another, the segments of the disk of lesser diameter receive and are electrically connected to the ends of the conductors that are spaced closest to the axis of the armature shaft. The segments on the other disk receive and are electrically connected to the conductors in the openings which are spaced radially outwardly of the first mentioned conductors.

In the preferred form of the invention, the commutator segments on the first and second metal disks are skewed in opposite directions with respect to a radially extending line passing through the center of the armature shaft. Each segment of the first disk is electrically connected to the proper segment of the other disk at the inner periphery of the disks. The conductor emerging from one of the openings in the winding supporting structure or stack of laminations positioned closest to the axis of the shaft is properly electrically connected through one of the segments of the first disk and one of the segments of the second disk to a conductor which is positioned in another coil opening spaced peripherally from the first coil opening and spaced radially outwardly from the other conductor positioned in this coil opening.

The two stamped disks mentioned above are electrically insulated from one another and have their commutator segments electrically insulated from one another by means of a plastic molding compound, which during a molding operation to be described subsequently, also molds a reinforcing bushing or ring into the commutator structure so that the commutator structure may be press fitted on the armature shaft.

In the construction of the commutator and armature, the first and second disks, preferably constructed of a copper metal, are formed so that the thickness of each disk is greater at a position adjacent to a central aperture positioned therein than it is at its outer periphery. The commutator segments may then be stamped and the two disks are positioned against each other, so that the inner portion of the commutator segments on the disks are in proper electrical engagement. The segments may then be brazed together, and placed, together with the reinforcing ring, in a mold comprised of two halves. One of these halves has a plurality of pins which extend into the conductor receiving means in the first disk, and the other half has a plurality of pins which extend into the conductor receiving means in the second disk. A molding compound is then injected into the mold that electrically insulates the two disks from each other, at the appropriate places, and electrically insulates the segments of each of the disks from one another. Additionally, a layer of insulating material is molded to the back portion of the disk of lesser diameter which will engage the winding supporting structure or stack of laminations when the commutator is positioned on the armature shaft. Additionally, an annular layer of insulating material is positioned between the inner periphery of the two disks and the reinforcing ring that is press fitted on the armature shaft. This annular layer of insulating material integrally forms this ring into the molded commutator structure.

To provide sufficient rigidity for the two disks during the molding operation, sufficient material is left around the periphery of each disk so that the segments of each disk are not electrically isolated from one another. Therefore, when the commutator is taken from the mold it is necessary to remove this material to electrically isolate the segments of each commutator disk from one another. This may be accomplished by placing the molded commutator in a lathe and turning the periphery of the disk of lesser diameter to remove sufficient material to electrically isolate the segments on this disk from one another. The commutator is then press fitted on the armature shaft, and the periphery of the disk of greater diameter is then machined down to isolate its segments from one another. The coils are then positioned in the coil receiving openings in the stack of laminations or winding supporting structure. The ends of the coils or conductors are then positioned within the conductor receiving means in the segments of the disk of lesser diameter. The ends of coils positioned in each coil receiving opening and positioned radially outwardly from the first conductor positioned therein are then bent radially outwardly.

The ends of the conductors positioned in the conductor receiving means of lesser diameter are then soldered to the segments of this disk, preferably by rolling the commutator in a solder bath. After this operation, the other conductors are positioned in the coil receiving openings of the disk of greater diameter and are soldered to the segments of this disk by rolling the commutator once again in the solder bath. The front face of the disk of greater diameter is then machined so that its plane is perpendicular to the axis of the armature shaft for the reception of commutating brushes which are positioned on an end plate of the dynamoelectric machine which utilizes this armature.

It is apparent that the angle at which the segments of the first disk and the second disk are skewed in relationship to a radial line passing through the armature shaft may be made equal to one another. On the other hand, they may be made unequal and, in fact, if the number of poles of a dynamoelectric machine with which the armature is to be used is sufficiently large so that the angle to be spanned about the periphery of the stack of laminations by one commutator element is small, one of the disks may be made with radially extending segments. This will preferably be the disk of lesser diameter, i.e., the one placed adjacent the end of the winding supporting structure or stack of laminations.

The construction of the present invention, therefore, eliminates the copper used and the space occupied between the risers and the end of a stack of laminations in a conventional dynamoelectric machine armature. As a result, for the same active length of conductor, the resistance of the armature windings are reduced to provide a higher efficiency dynamoelectric machine that has more output per unit volume. Additionally, since the commutator is positioned closely adjacent the end stack of laminations and the conductors are confined therein, these conductors cooperate in resisting the centrifugal force on the commutator segments thereby providing greater rigidity at high rotary speeds.

BRIEF DESCRIPTION OF THE DRAWINGS

FIG. 3 is a plan view of a copper blank used in making one of the disks of the commutator of the present invention.

FIG. 4 is an end elevational view of the blank shown in FIG. 3.

FIG. 5 is a top plan view of the other blank used in making the other disk of the commutator.

FIG. 6 is an end elevational view of the blank shown in FIG. 5.

FIG. 7 is a partial view of one commutator disk after it has been stamped from the blank shown in FIGS. 3 and 4.

FIG. 8 is a partial view of the other commutator disk after it has been stamped from the blanks shown in FIGS. 5 and 6.

FIG. 9 is a side elevational view of the two commutator disks shown in FIGS. 7 and 8 after they have been properly brazed together.

FIG. 10 is a front partial elevational view of the armature shown in FIG. 1.

DESCRIPTION OF THE PREFERRED EMBODIMENT

Figure 1:
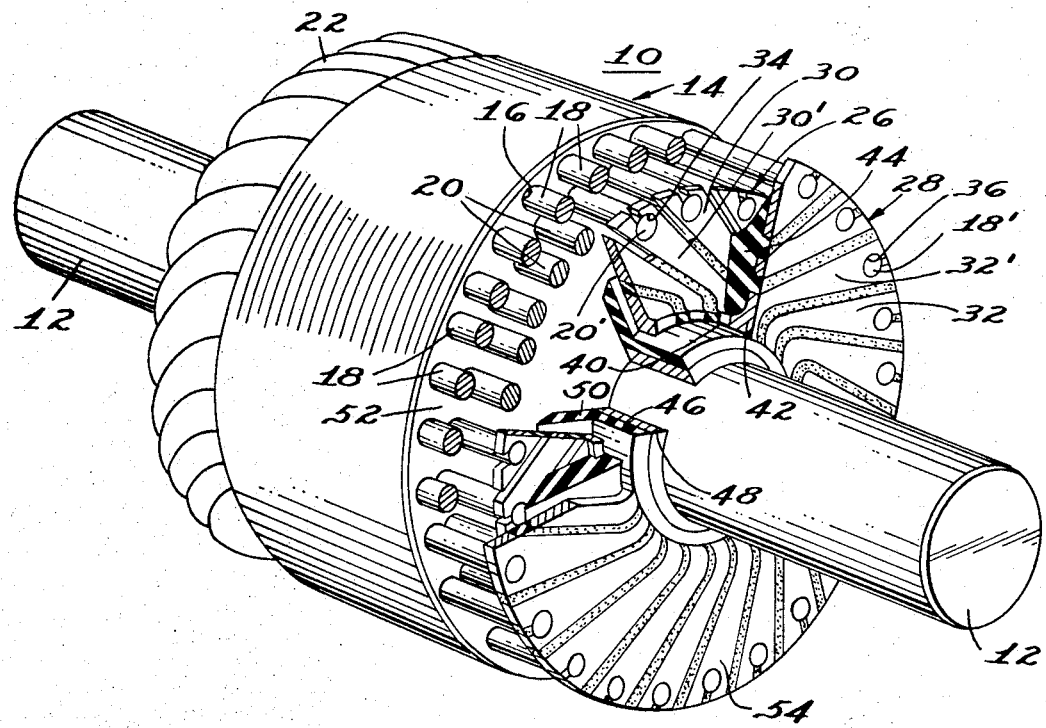
FIG. 1 is a perspective view partially cut away of the dynamoelectric machine armature of the present invention.
Figure 2:
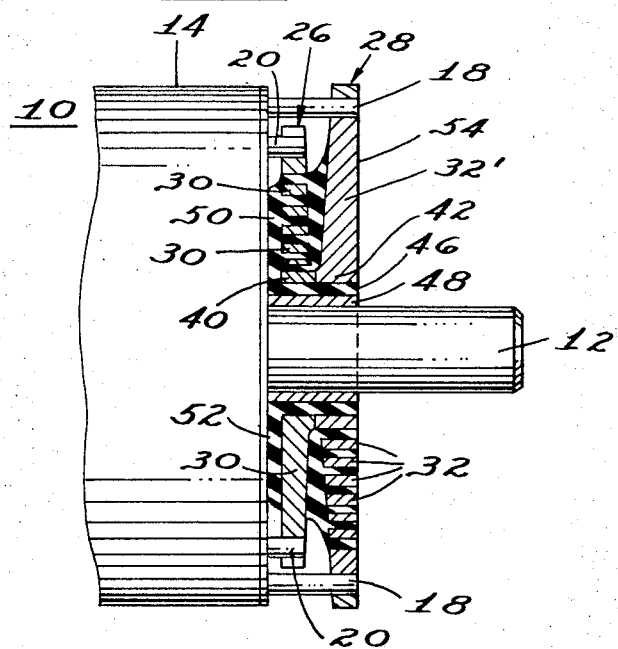
FIG. 2 is a sectional view taken along the lines 2—2 of FIG. 1.

Referring now to the drawings in which like reference numerals designate like parts throughout the several views thereof, there is shown in FIGS. 1 and 2 a dynamoelectric machine armature 10 having a shaft 12. A winding supporting structure 14, preferably in the form of a stack of a plurality of laminations, is mounted on the shaft 12, and it has a plurality of coil receiving openings 16 extending the length thereof and preferably parallel to the axis of the shaft 12. Each of these coil receiving openings 16 contains at least two conductors, 18 and 20, which are electrically insulated from each other and are preferably spaced radially from each other as shown. The above mentioned structure is common in the dynamoelectric machine art and the conductors 18 and 20 positioned in each coil receiving opening 16 form a portion of a hairpin winding which includes an integrally formed connecting means generally shown at 22.

The commutator 24 of the dynamoelectric machine armature 10 comprises a first disk 26 and a second disk 28, with the first disk 26 being of lesser diameter than the second disk 28. Each of the disks is formed with a plurality of segments that are electrically insulated from one another. The segments of the first disk are denoted by the numeral 30, while the segments of the second disk are denoted by the numeral 32. Each segment 30 of the first disk 26 has a conductor receiving means in the form of a slot and aperture 34, while each segment 32 of the second disk 28 also has a conductor receiving means in the form of an aperture and slot 36. One of the segments 30' of the first disk 26 is joined and electrically connected to a segment 32' of the second disk 28 by means of an axial extending flange 40 on segment 30' and an axially extending flange 42 on the segment 32' as will be explained more fully subsequently these flanges 40 and 42 are joined and electrically connected by a brazing operation.

To complete a winding for the machine, one of the inner conductors 20' positioned in one of the coil receiving openings 16 is connected to the segment 30' of disk 26 by being received within the conductor receiving means 34, and the circuit is completed from this lead 20' through the segment 30' flange 40, flange 42, segment 32' of the second disk 28 to conductor 18' positioned in another coil receiving opening 16 in the winding supporting structure or stack of laminations 14. The two conductors 20' and 18' are peripherally spaced about the winding supporting structure or stack of laminations 14, and the angle subtended by them is equal to 360° divided by the number of magnetic poles of the machine. For example, if the machine has four poles, the angle subtended between the conductor 20' and 18' would be 90°. If the dynamoelectric machine has six magnetic poles the angle subtended by the conductors 20' and 18' would be 60°.

Electrical insulating material, in the form of a molding compound, generally designated by the numeral 44, electrically insulates the first disk 26 from the second disk 28 except where one of the segments 30 of the first disk 26, for example, segment 30' is joined to a segment 32 of the second disk 28, for example, segment 32', via the flanges 40 and 42.

The molding compound also forms a ring 46 which electrically insulates the segments 30 on the disk 26 and the segments 32 on the disk 28 from a steel reinforcing ring or bushing 48 which is press fitted on the shaft 12. This ring 48 is integrally formed with the molding compound operation as will be described subsequently. Also, the molding compound extends from ring 46 perpendicularly thereto to form an insulating layer 50 positioned between the first disk 26 and the end 52 of the winding supporting structure or stack of a plurality of laminations 14. The front face 54 of the disk 28 is positioned substantially perpendicularly to the axis of the shaft 12 and is adapted to receive a plurality of commutating brushes which are mounted in the housing of the dynamoelectric machine.

It can be readily appreciated that since the coil receiving opening 34, positioned in the segments 30 of the first disk 26, are in alignment with the conductors 20 and the conductor receiving means 36, positioned in the segments 32 of the second disk 28, are in alignment with the conductors 18, the conventional bending of the conductors as they emerge from the coil receiving openings in a standard dynamoelectric machine armature has been eliminated. This eliminates the need for the extra length of conductors to accommodate this bending and also the space occupied by these conductors, as they are bent in the conventional machine, has been eliminated since the commutator 24 is positioned directly adjacent the end 52 of the winding supporting structure or plurality of laminations 14.

Each pair of connected segments 30 and 32 of the first disk 26 and second disk 28 respectively form a conductive or metal commutator element. As shown in FIG. 1, the segments 30 of the first disk 26 and the segments 32 of the second disk 28 are skewed or positioned at an angle with the respect to a radial line extending from the center line of shaft 12. As shown here, they are skewed in opposite directions to span the distance between the conductors that they connect, for example, conductor 20' and conductor 18'. These angles, as shown, are substantially equal to one another, but this is not necessary. In fact, with a machine that has a large number of poles, one of the disks, either disk 26 or disk 28, may have commutator segments that extend radially outwardly from the center line of the shaft 12. Preferably, this would be the disk 26 which is positioned closest to the end 52 of the winding supporting structure or stack of plurality of laminations 14.

Referring now to FIGS. 3 through 6 there are shown the blanks that are used in the construction of the disks 26 and 28. FIGS. 3 and 4 show the blank 60 used in constructing the disk 26 and it can be seen that this blank 60 is annular in configuration and has a central aperture 62. The thickness of the blank 60 is greatest, directly adjacent the aperture 62 as shown in FIG. 4, and this thickness tapers outwardly to a thinner dimension 64 on the outer periphery. The blank 66 shown in FIG. 5 used to construct disk 28 also has a central aperture 68 of the same size as the central aperture 62 in blank 60 and this blank also is tapered from its thickest section adjacent the aperture 68 to its thinnest dimension on the periphery 70.

The blank 60 is then formed, preferably by stamping, into the structure shown in FIG. 7 so that it has a plurality of slots 72 positioned therein. Each slot 72 has a first portion 74 that extends generally radially from the center of the aperture 62 and then at a substantial angle to form a second portion 76. As shown on this drawing, the angle between the portion 74 and the portion 76 of the slots 72 is approximately 90°. The blank is also formed with the plurality of conductor receiving means 34 in the form of aperture and slots. It can be readily seen that the second portions 76 of the slots 72 do not extend to the periphery of the structure shown in FIG. 7.

The blank 66 shown in FIGS. 5 and 6 is similarly formed into a structure partially shown in FIG. 8 so that there are a plurality of slots 80 positioned therein having a first portion 82 positioned on a line that extends substantially radially from the center of the aperture 68 and a second portion 84 that extends at an angle to the first portion 82. The angle between the first portion 82 and the second portion 84 may be somewhat greater than the angle between the first portion 74 and the second portion 76 of the slot 72 formed in the structure as shown in FIG. 7. As was the case with the blank 60, the conductor receiving means 36 in the form of the aperture and slot are positioned in the blank and the second portions 84 of slots 80 do not extend to the periphery of the blank. It should be noted that the portion 76 of slots 72 in blank 60 and the portion 84 of the slots 80 in the blank 66 extend in opposite directions with respect to one another and with respect to a line which extends radially from the axis of the shaft 12. The blanks 60 and 66 which are formed into the structures shown in FIGS. 7 and 8 respectively are then positioned against each other as shown in FIG. 9 with the flanges 40 and 42 formed thereon in abutting relationship. A brazing alloy of conventional composition for example, copper and tin, is placed between the abutting surfaces of the flanges 40 and 42. The structure shown in FIG. 9 is then heated to a sufficient temperature for a sufficient length of time to braze the flanges 40 and 42 together in a solid electrically conductive fashion.

The structure shown in FIG. 9 is then placed in a mold comprised of two halves. One half of the mold has a plurality of pins positioned through the conductor receiving means 34 in the structure shown in FIG. 7, and the other half of the mold has a plurality of pins which extend through the conductor receiving means 36 in the structure shown in FIG. 8. The steel ring or bushing 48 is also placed properly within the mold so that it fits in spaced relationship with respect to the flanges 40 and 42 formed on each of the segments of the first disk 26 and second disk 28 respectively. A conventional molding compound having high mechanical strength and high insulating properties is then injected into the mold to form the commutator structure. This molding compound finds its way into the slots 80 and the slots 72 in the structure shown in the FIGS. 8 and 7 respectively and is positioned between the two structures in the space 90 as shown in FIG. 9. The mold is formed so that the molding compound forms the annular insulating structure 50 shown in FIG. 1. This molding compound also molds the ring or bushing 48 into the commutator structure 24 that is being formed during this molding process and it is bonded to the insulating ring 50.

After the structure is removed from the mold, it is placed in a lathe or other turning device where the periphery of the first blank 60, forming disk 26, is machined to a depth that exposes the ends of the portion 76 of slots 72 to thereby form the conductive segments 30 as shown in FIGS. 1 and 10.

This structure is then placed on the armature shaft 12 by press fitting the metal bushing or ring 48 on the shaft 12 and positioning the annular layer 50 of molding compound against the end 52 of the winding supporting structure or stack of a plurality of laminations 14. The periphery of the blank 66 is then machined or turned to expose the ends of portions 84 of slots 80 to form the segments 32 and complete disk 28.

As is conventional in the construction of a dynamoelectric machine armature, a plurality of hairpin conductors that includes conductors 18 and 20 are then positioned in the coil receiving openings 16 by means of a conventional machine. The conductors 20 are then positioned in the conductor receiving means 34 in each of the segments 30 of the disk 26, while the outward conductors 18 in each of the coil receiving openings 16 are bent radially outwardly at substantially a right angle. The conductors 20 are then soldered to the conductive segments 30, preferably by rolling the periphery of the disk 26 in a solder bath. After this operation, the conductors 18 are positioned within the conductor receiving means 36 in each segment 32 of the disk 28 and the periphery of the disk 28 is then rolled in a solder bath to properly electrically connect the ends of the conductors 18 to their respective segments 32. The radial face 54 formed by the segments 32 and the insulating material positioned in the slots 80 is then machined so that the face 54 forms a plane which is perpendicular to the axis of the shaft 12. This is done so that the brushes of the commutating type which are adapted to engage the radial face 54 will ride thereon smoothly and properly perform their commutating function.

It can best be seen by reference to FIGS. 1 and 10 that each commutator segment 32 of disk 28 is electrically connected through flanges 40 and 42 to a corresponding segment 30 positioned in the disk 26. For example, as shown, the commutator segment 32' connected to conductor 18' is connected via the axial extending flange 40 of this segment to segment 30' of disk 26 via its axial extending flange 42. The segment 30' in turn is connected to conductor 20'. This connection of the axially extending flanges 40 and 42 is shown generally by the area 96 in FIG. 10. Similarly a conductive segment 32'' connected to a conductor 18'' is electrically connected to segment 30'' connected to conductor 20''. Segments 32'' and 30'' are connected via their axially extending flanges 40 and 42 respectively which are positioned in the area designated by the numeral 98. The portions 74 of slots 72 and the portions 82 of slots 80 together with the insulating ring 46 and the insulating material positioned in the portions 74 and 82 separate the electrical connections of the segments 30 and 32 formed by flanges 40 and 42.

As shown in FIG. 10 the angle subtended by a line passing through the conductor 18' connected to commutator segment 32' and the center of the shaft 12 and by a line passing through to the conductor 20' and the center of shaft 12 is approximately 90°. This is the case with any conductor 18 connected to any other conductor 20 through a segment 32 of disk 28 and a segment 30 of disk 26. This is true for a four pole dynamoelectric machine, where the conductors of the windings are positioned at 90° around the periphery of the winding support structure or plurality of laminations. As stated previously, this angular spacing is dependent upon the number of poles of the dynamoelectric machine in which the armature of the present invention is used and is equal to 360° divided by the number of poles.

The present invention thus provides a dynamoelectric machine armature which is easy to assemble, is inexpensive and saves the copper used in a conventional machine to connect the windings or conductors as they emerge from the armature winding support structure to the risers of the commutator. In addition to the saving in copper, the reduction in the length of the conductor used effectively reduces the resistance of the windings of the armature thereby increasing the efficiency of a dynamoelectric machine employing the armature and increasing its output per unit volume.

Having thus described a preferred embodiment of my invention, what I claim and desire to secure by U.S. Letters Patent is:

1. A substantially cylindrical rotatable dynamoelectric armature comprising a shaft, a stack of a plurality of laminations mounted on the shaft, a plurality of coil receiving openings formed in said stack of laminations extending the length of the stack of laminations and substantially parallel with the axis of the armature shaft, each of such coil receiving openings containing at least two conductors which are electrically insulated from each other and which are spaced radially from each other, a metal commutator element having a first conductor receiving means adjacent to and aligned with a first coil receiving opening and said metal commutator element having a second conductor receiving means adjacent to and aligned with a second coil receiving opening which second coil receiving opening is peripherally spaced from said first coil receiving opening, said first conductor receiving means being electrically connected to a conductor emerging from said first coil receiving opening and said second conductor receiving means being electrically connected to a conductor emerging from said second coil receiving opening.

2. The combination of claim 1 in which said first conductor receiving means is spaced radially outwardly from said second conductor receiving means and said first conductor receiving means is electrically connected to the conductor spaced radially from the other conductor in said first coil receiving opening, and said second conductor receiving means is connected to the conductor spaced radially inwardly from the other conductor in said second coil receiving opening.

3. The combination of claim 2 in which said first conductor receiving means and said second conductor receiving means are axially spaced from one another along the axis of said shaft.

4. The combination of claim 3 in which said second conductor receiving means is positioned axially between said first conductor receiving means and said stack of laminations.

5. The combination of claim 4 in which a plurality of said metal commutator elements electrically insulated from one another comprises a commutator for the dynamoelectric machine armature.

6. The combination of claim 5 in which said first conductor receiving means of said plurality of sheet metal commutator elements are positioned in a plane positioned at substantially right angles to the axis of said shaft and are adapted to receive electrical commutator brushes.

7. A direct current dynamoelectric machine armature comprising a shaft, a pair of substantially straight condctors, means mounted on said shaft for supporting said conductors at spaced locations about the periphery of said means, a commutator positioned on said shaft adjacent one end of said means, said commutator including means for electrically connecting one end of one of said conductors adjacent said end of said means to the end the other conductor adjacent said end of said means.

8. The combination of claim 7 in which said commutator comprises a first disk comprised of a plurality of conductive segments and a second disk comprised of a plurality of conductive segments.

9. A dynamoelectric machine rotor comprising a shaft, a pair of substantially straight conductors, means mounted on said shaft for supporting said conductors at spaced locations about the periphery of said means, said conductors having ends extending from said means at said spaced locations, a conductive commutator element positioned adjacent one end of said means spanning the distance between the ends of said conductors and electrically connected to the ends of said conductors of said spaced locations.

9. A dynamoelectric machine rotor comprising, a shaft, a winding, a winding supporting structure mounted on the shaft, said winding comprising a pair of conductors positioned at spaced locations about the periphery of said winding supporting structure, a commutator positioned on said shaft at one end of said winding supporting structure, said commutator including means mechanically and electrically spanning the distance between said spaced locations and connected to the ends of said conductors of said spaced locations.

11. A direct current dynamoelectric machine armature comprising a shaft and a plurality of armature windings, each of said armature windings having a first and a second conductor extending generally parallel to the axis of the shaft and spaced about the periphery of the armature at a subtended angle equal to 360° divided by the number of magnetic poles of the dynamoelectric machine, a commutator comprising a first flat disk of electricaly conductive material and a second flat disk of conductive material positioned on said shaft and electrically insulated therefrom, each of said disks extending in a plane substantially perpendicular to the axis of said shaft and electrically insulated from one another, each of said disks being comprised of a plurality of conductive segments each electrically insulated from the other, one of said segments of said first disk being electrically joined with one of said segments of said second disk at a junction adjacent said shaft and positioned between said first and said second conductors of said windings, the segment of said first disk extending angularly to said first conductor from said junction and the segment of said second disk extending angularly in the opposite direction from said junction to said second conductor, said first conductor being electrically connected to the segment of said first disk at its outer periphery and said second conductor being connected to the segment of said second disk at its outer periphery.

12. The combination of claim 11 in which said first disk has a larger diameter than said second disk and said second disk is axially spaced from said first disk in a direction toward said armature windings.

References Cited

UNITED STATES PATENTS

| | | | |
|---|---|---|---|
| 1,790,413 | 1/1931 | Fave | 310—233 |
| 1,416,256 | 5/1922 | Borger | 310—237 |

WARREN E. RAY, Primary Examiner

L. L. SMITH, Assistant Examiner

U.S. Cl. X.R.

310—237